United States Patent [19]

Neirman et al.

[11] 4,397,886
[45] Aug. 9, 1983

[54] METHOD FOR MAKING A CERAMIC INTERGRANULAR BARRIER-LAYER CAPACITOR

[75] Inventors: Stephen M. Neirman; Ian Burn, both of Williamstown, Mass.

[73] Assignee: Sprague Electric Company, North Adams, Mass.

[21] Appl. No.: 357,940

[22] Filed: Jan. 15, 1982

Related U.S. Application Data

[63] Continuation-in-part of Ser. No. 261,065, May 6, 1981.

[51] Int. Cl.³ .............................................. B05D 5/12
[52] U.S. Cl. ...................................... 427/80; 427/87; 427/88; 357/10
[58] Field of Search ............... 427/80, 87, 88; 357/10; 361/321

[56] References Cited

U.S. PATENT DOCUMENTS

| 3,074,804 | 1/1963 | Planer | 357/10 |
| 3,299,332 | 1/1967 | Saburi | 357/10 |
| 3,419,758 | 12/1968 | Hayakawa et al. | 357/10 |
| 3,569,802 | 3/1971 | Brauer | 357/10 |
| 3,933,668 | 1/1976 | Takahashi et al. | 252/63.5 |
| 4,311,729 | 1/1982 | Itakura et al. | 427/80 |

OTHER PUBLICATIONS

Nishimura et al, Proceedings of the Jap. Conf. on Materials Research 1969, vol. 12, pp. 207–208.

*Primary Examiner*—Michael H. Lusignan
*Assistant Examiner*—Richard Bueker

[57] ABSTRACT

A donor modified strontium titanate formulated to become conductive when sintered in air, is further modified with a minute quantity of manganese and sintered to maturity in a nitrogen atmosphere. A paste including silver particles, and oxides of bismuth and copper is applied to two major portions of the body. The coated body is heated at about 920° C. to oxidize the grain boundaries and to form silver electrodes tightly adhered to the body.

5 Claims, 3 Drawing Figures

METHOD FOR MAKING A CERAMIC INTERGRANULAR BARRIER-LAYER CAPACITOR

CROSS REFERENCE TO RELATED APPLICATION

This application is a continuation-in-part of application Ser. No. 261,065 filed May 6, 1981.

BACKGROUND OF THE INVENTION

This invention relates to a ceramic grain-interface barrier-layer capacitor and more particularly to a method of making such an intergranular-barrier capacitor wherein strontium titanate is doped with a donor material and manganese, sintered in an inert gas, and then heated to simultaneously oxidize the grain boundary and fire the electrodes.

The ceramic body described in the above-identified cross-referenced patent application, Ser. No. 261,065, is based upon a strontium titanate that is doped with a donor material in such a way that there is created within the ceramic crystal a number of strontium vacancies. Furthermore, the stoichiometry including the amount of donor atoms is adjusted to achieve a balance between large and small cations while the strontium vacancies are depended upon for charge balance in the grains. Such materials, being fired to maturity in air, contain semiconducting grains. They are subsequently impregnated with an oxidizing agent and heated to effect oxidation of the intergranular barrier layers. A silver paste is then applied and the ceramic is heated a third time to fire the silver electrodes. A triple heating process is also used to make the earlier more traditional barrier layer capacitors that are sintered in an active reducing gas.

Excellent capacitors can be made in this manner when employing high purity strontium titanate in the start materials, whereas certain industrial grade strontium titanates, that are lower in cost and more readily available, often contain sufficient quantities and kinds of contaminates such as silicon and a variety of acceptors, that lead to poor quality capacitors with relatively low values of the effective (apparent) dielectric constant.

It would be an improvement of great practical value to the manufacture of disc capacitors and the like if industrial grade start materials could be used and the oxidation could be accomplished simultaneously with the firing on of the silver electrodes. The difficulty with a single oxidizing/electroding heating step has been in oxidizing effectively the semiconducting donor-doped strontium titanate at a temperature below the melting point of silver (960° C.).

Such low temperature oxidation steps tend only to oxidize the grains near the ceramic body surfaces. Such superficial oxidation leads to a hybrid capacitor, between a surface-barrier type and an intergranular-barrier type. As has been described in the above-identified application and further in a paper by Rolf Wernicke presented at the third International Joint Meeting "Electrical and Magnetic Ceramics" on Nov. 17 and 18, 1977 at Noordwijkerhout, the Netherlands, such a capacitor has a few intergranular dielectric barrier layers at the surface, the ceramic material in between consisting of a conducting mass of semiconductive grains. The apparent dielectric constant can be extremely high while the breakdown voltage will be very low. Also such hybrid type capacitors are distinguished by having an apparent dielectric constant that is a strong function of body thickness, while for a true intergranular barrier layer capacitor the apparent dielectric constant is the same for all body thicknesses.

It is an object of this invention to provide a simple and low cost method capable of employing industrial grade start materials for making an intergranular barrier layer capacitor having an apparent dielectric constant that is not a function of body thickness.

It is another object of this invention to provide such a method including sintering in an atmosphere free of active reducing gas.

It is another object of this invention to provide such a method including only two heating steps i.e. one for sintering and another for both oxidizing the grain boundaries and for firing on a silver electrode.

It is a further object of this invention to provide an intergranular boundary layer capacitor with effective dielectric constant greater than 50,000 by using $SrTiO_3$ of reagent or higher purity.

SUMMARY OF THE INVENTION

A low cost and reliable method for making a ceramic intergranular barrier layer type capacitor includes a strontium titanate body with donor atoms and a minute amount of manganese, sintering the body in an inert atmosphere, e.g. nitrogen, diffusing oxidizing agents into the sintered body to penetrate and oxidize the grain boundaries and, simultaneously with the diffusing and oxidizing, forming two spaced electrodes in contact with the body.

These simply produced capacitors are made using readily available industrial grade strontium titanate or a high purity strontium titanate in the start materials.

This result is made possible however by the use of a very narrow range of start compositions. In order to produce highly reduced semiconductive bodies in a single sintering step without use of active reducing agents in the sintering atmosphere, it is essential that the start strontium titanate be donor doped and adjusted so that in the ceramic grains, strontium vacancies considered as large cations can both provide balance between large and small cations in the crystal as well as provide overall cation charge balance. This is described more fully in the above noted patent application Ser. No. 261,065. In addition, a tiny amount of manganese is added and the ceramic composition then conforms to

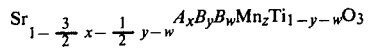

wherein the donor is selected from large cations A, small cations B and combinations thereof, and x, y and w are the atomic proportions, respectively, of the donor cations having a charge of +3, +5 and +6. Thus both charge balance and large/small cation balance may be established by strontium vacancies, $$(V_{Sr})_{\frac{1}{2}x+\frac{1}{2}y+w},$$

wherein x+y+w is from 0.003 to 0.021 and wherein z lies between 0.00005 and 0.0025. Thus the donor amounts from 0.3 mole percent to 2.1 mole percent and the manganese addition ranges from 0.005 mole percent to 0.25 mole percent.

The simultaneous oxidizing and electroding is subsequently accomplished by preparing a mixture of silver particles and oxidizing agents, such as bismuth, copper and manganese oxides, applying a coat to selected body surface regions and heating at less than the melting point of silver to effect the diffusion of the oxidizing agents throughout the grain-boundaries network and to fire the silver to form the electrodes.

This process for making barrier layer strontium titanate capacitors may employ industrial grade strontium titanate and involves just two heating steps, one in a safe inert atmosphere and the other in air, but high quality capacitors made by this simple low cost method is contingent upon the initial addition in specific tiny amounts of donor atoms and manganese and careful stoichiometric adjustment of the start material.

DESCRIPTION OF THE PREFERRED EMBODIMENTS

In the following examples, the ceramic start materials include industrial grade strontium titanate and a strontium-titanate donor material so formulated that, at the subsequent sintering, large/small cation balance and charge balance are obtainable by the incorporation of a quantity of strontium vacancies in the ceramic grains, each vacancy being counted as a large cation of zero charge. A general expression for this composition is:

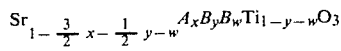

wherein x, y and w are the atomic proportions, respectively, of the donor cations having a charge of 30 3, +5 and +6. The charge balance and large/small cation balance are established by strontium vacancies expressed by $$(V_{Sr})_{\frac{1}{2}x+\frac{1}{2}y+w}.$$

The sum $x+y+w$ is from 0.003 to 0.017 when the start strontium titanate is used, as is described in the above-identified application, which is incorporated by reference herein. However, when industrial grade $SrTiO_3$ is used that contains higher levels of acceptor elements, e.g. aluminum and iron, the appropriate amount of donor to be added must include an extra donor amount that will charge balance the acceptors. Thus, as will be seen, the method of this invention advantageously accommodates the lower cost industrial grade materials as well as high purity $SrTiO_3$. The sum $x+y+w$ properly ranges from 0.007 to 0.021 for use with industrial grade strontium titanate.

After the bodies were sintered, oxidized, and electroded, capacitance and DF measurements of the experimental capacitors were made at 1 KHz and 1 volt (RMS). I.R. measurements were made at 2.5–5 volts per mil after charging for 2 minutes.

EXAMPLE 1

To investigate the effect of Mn on donor doped $SrTiO_3$, industrial grade $SrTiO_3$ was doped with 1.0 mole % Y and different amounts of Mn (0 to 0.3 mole %). The dominant impurities in this lot of strontium titanate were 0.35 weight percent $SiO_2$ (1.1 mole percent) and 0.3 weight percent $Al_2O_3$ (0.54 mole percent). 1.0 mole % $SrCO_3$ was also added to each formulation as a stoichiometry adjustment to maximize grain size. Squares approximately $10 \times 10 \times 0.4$ mm in size of each composition were then fired overnight in air at 1450° C., producing bodies with maximum sized grains of about 50 microns.

Figure 1:
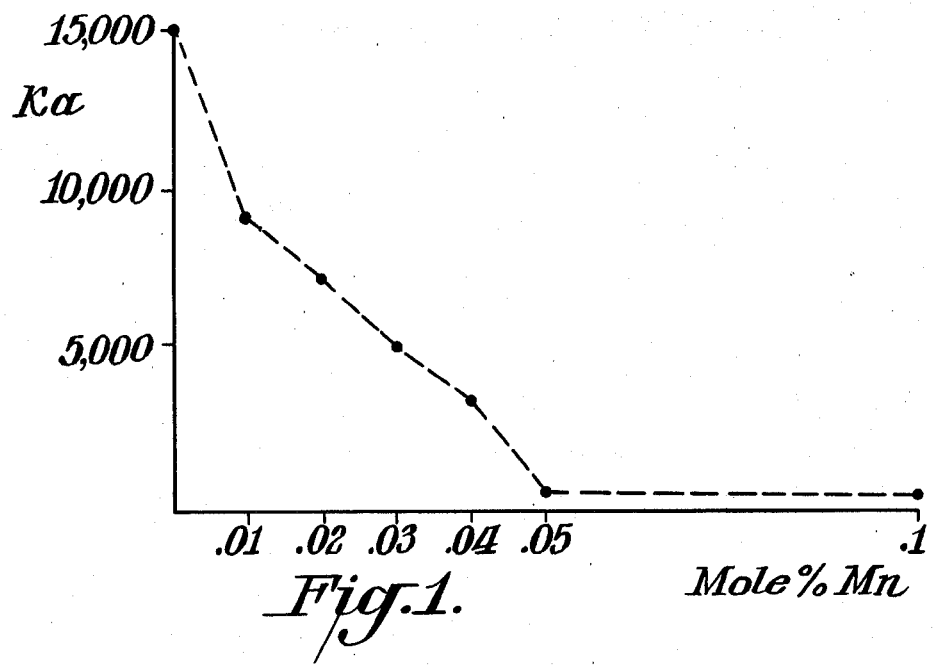
FIG. 1 is a graph of the apparent dielectric constant of intergranular-barrier layer capacitors, having a donor-doped $SrTiO_3$ air-sintered body, as a function of the amount of manganese that has been added to the ceramic.

In-Ga electrodes were painted on the major surfaces and capacitance was measured. The apparent dielectric constant was calculated from the capacitance and dimensions of the sample. The results are summarized in the graph of FIG. 1. It is seen that 0.05 mole % Mn removes virtually all evidence of barrier layers. That material has an apparent dielectric constant, Ka, close to that of undoped $SrTiO_3$, (about 350). It is tan colored rather than gray.

When other bodies of these same formulations were fired in $N_2$ instead of air, the Mn had no visible effect. The grains were still dark gray and conducting.

EXAMPLE 2

Other acceptor dopants did not have the same effect as Mn. Again, the $SrTiO_3$ of Example 1 was doped with 1.0 mole % Y and 0.1 mole % of various other dopants (Ga, Fe, Mg, Cr, Co, Ni); 1.0 mole % $SrCO_3$ was added to maximize grain size. The bodies were fired at 1450° C. in air overnight and had maximum sized grains of about 50 microns. All of the bodies still showed evidence of barrier layers. But only chromium shows any real indication of having an effect similar to Mn, and it is much less potent as seen from the data in Table I.

TABLE 1

| Dopant | Ka |
|--------|-----|
| Ga | 14,500 |
| Fe | 14,200 |
| Mg | 17,000 |
| Cr | 7,000 |
| Co | 13,300 |
| Ni | 11,000 |
| Mn | 350 (Example 1) |

EXAMPLE 3

Four $SrTiO_3$ start formulations were made from the same start $SrTiO_3$ as in Example 1, each with additions 0.7 mole percent yttrium, and 1.5 mole percent $SrCO_3$ for large/small cation balance and charge balance as explained herein above. The four start formulations had from zero to 0.1 mole percent manganese oxide ($MnO_2$) added as indicated in Table II. Bodies formed of each material were now sintered at 1450° C. for 15 hours in nitrogen instead of air and all became strongly semiconducting.

Figure 2:
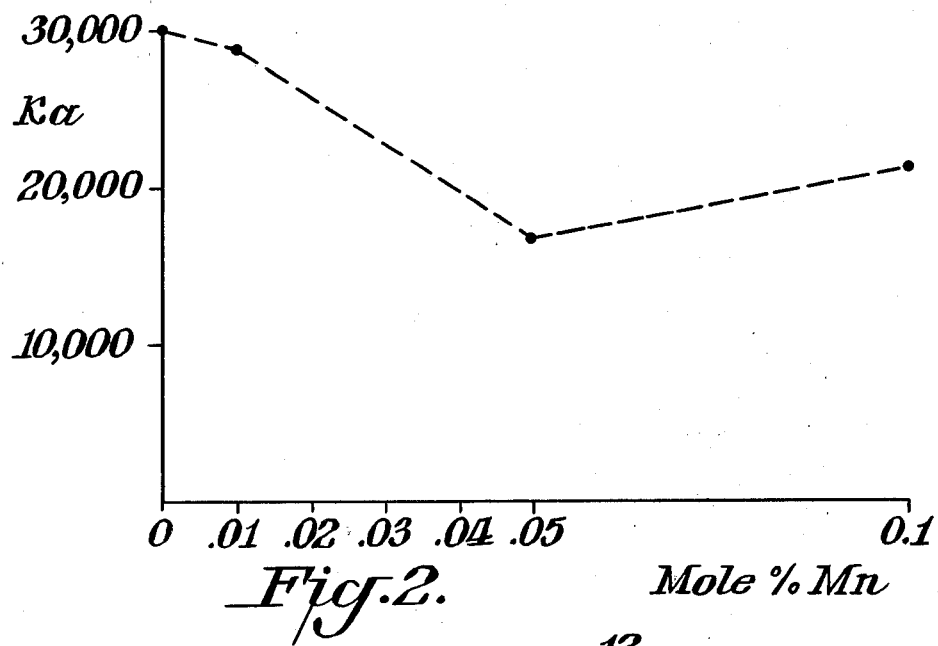
FIG. 2 is a graph of the apparent dielectric constant of intergranular barrier layer capacitors of this invention, having a doner doped $SrTiO_3$ nitrogen-sintered body, as a function of the amount of manganese that has been added to the ceramic.

A combination oxidizing and electroding paste was made by mixing 4.8 grams $Bi_2O_3$, 0.25 grams CuO and 5 grams silver powder in an organic vehicle. This paste was applied to the two opposite major surfaces of each sintered body and heated 10 hours at 920° C. The resulting four groups of capacitor chips give electrical performances as shown in Table II and plotted in FIG. 2.

TABLE II

| Ex. | Mn (mole %) | Ka | D.F. (%) | I.R. (Ω F) |
|---|---|---|---|---|
| 3a | 0 | 30,100 | 2.1 | 0.9 |
| 3b | 0.01 | 29,400 | 1.3 | 270 |
| 3c | 0.05 | 17,800 | .22 | 730 |
| 3d | 0.1 | 21,500 | .33 | 670 |

Minute amounts of manganese added to the start materials is seen to produce a large improvement in the insulation resistance of the capacitor. Such manganese additions make possible the co-firing of silver electrodes at low temperatures, i.e. less than the melting point of silver or 960° C., while simultaneously impregnating the body to oxidize the intergranular layers.

Figure 3:
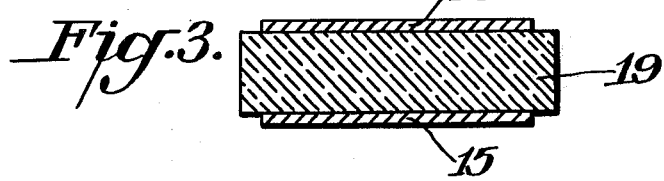
FIG. 3 shows a side sectional view of a disc capacitor of this invention.

The fired silver electrodes 13 and 15 are tightly bonded to the opposite major surfaces of the ceramic body 19 as shown in FIG. 3.

EXAMPLE 4

A group of chip capacitors 11 mils (0.27 mm) thick were made from a start mixture containing an industrial grade $SrTiO_3$ from a different source containing 0.6 weight percent $SiO_2$ and 0.1 weight percent $Al_2O_3$ and having 1 mole % excess $TiO_2$. A donor level of 0.7 mole % yttrium was added but no manganese. Firing was in nitrogen at 1450° C. for 15 hours, as in Example 3. The Bi/Cu silver-electroding paste of Example 3 was applied to the opposite major surfaces of each chip and fired for 10 hours at 920° C. in air. The dielectric constant was 30,400 and DF was 0.4%, but insulation resistance was very poor, namely less than 10 ohm farads. This process was repeated several times, with different amounts of oxidizing paste. Dielectric constants as high as 31,000 were obtained, but the insulation resistance was consistently very low, in all cases less the 30 ohm farads.

EXAMPLE 5

Satisfactory insulation resistance could be achieved with the chips of Example 4 by using the prior art triple firing process. That is, after sintering in $N_2$ at 1450° C. for 15 hrs., they were coated with a Bi/Cu paste and re-oxidized at 1100° C. for 10 hours. Then film electrodes were applied and heated to 900° C. for a short time. The resulting capacitors had dielectric constants ranging from 22,000 to 30,000, DF less than 0.5%, and insulation resistance of from 500–900 ohm farads.

EXAMPLE 6

Capacitor chips were made as in example 4 except that 0.1 mole % manganese was added to the start materials. These bodies were also sintered at 1450° C. for 15 hours in nitrogen, and were simultaneously oxidized and electroded with a Bi/Cu silver paste for 10 hours in air at 900° C. Eielectric constants (Ka) ranging from 29,000 to 46,000 were obtained. DF was less than 1% and insulation resistance varied from 300 to 900 ohm farads. This confirmed the beneficial effect of manganese additions on the insulation resistance of capacitors simultaneously re-oxidized and silvered at 900° C. as demonstrated in Example 3.

In addition, these results were repeated with thicker capacitors, like those of examples 1, 2 and 3. Values of apparent dielectric constant (Ka) and insulation resistance were obtained similar to those above in this example, indicating that these capacitors are essentially wholly intergranular barrier layer structures.

EXAMPLE 7

In this example, high purity $SrTiO_3$ with a small $TiO_2$ excess of 0.4 mole percent was used. To this was added 0.4 mole percent yttrium and 0.2 mole percent $TiO_2$. The method of stoichiometry adjustment followed that disclosed in the patent application referenced above. One set of samples were made with no manganese additions to the start materials. Whereas the other set had 0.05 mole percent $MnCO_3$ added. Thickness of these bodies ranges from 19 to 17 mils (0.48 to 0.43 mm). Both sets of samples were fired in nitrogen as in the preceeding examples and then were electroded by applying silver paste containing $Bi_2O_3$ and $Cu_2O$ as before, and heating at 900° C. for 10 hours. Typical properties, demonstrating the outstanding results obtained when manganese is added to the start materials are summarized in Table III.

TABLE III

| Sample | Mn (mole %) | I.R. (Ω F @ 50V) | Ka | B.D.* (Volts RMS) | B.D.* (o-pk. volts/mm) |
|---|---|---|---|---|---|
| 7a | 0 | 5 | 63,000 | 140 | 410 |
| 7b | 0 | 5 | 83,000 | 115 | 375 |
| 7c | 0.05 | 1540 | 61,000 | 140 | 410 |
| 7d | 0.05 | 1020 | 59,000 | 130 | 400 |

Note:
*Maximum voltage that can be sustained (not really breakdown). Higher voltages resulted in high leakage current (with ohmic heating). The material usually recovered when the voltage was removed (i.e. varistor behavior).

The air fired capacitors of the above-referenced application, can offer nearly as great capacities as do equal size conventional hydrogen fired capacitors, yet they breakdown at higher voltages and further, when the over voltage is of short duration, no damage is done to the dielectric unlike for the conventional hydrogen fired capacitors. The low cost nitrogen fired barrier layer capacitors of this invention also exhibit non-catastrophic breakdown, as indicated in Table III and a choice between capacitors of this invention and the air fired capacitors of the referenced application involves a trade off between the higher breakdown voltages of the air fired capacitors and the higher dielectric constants of the nitrogen fired capacitors of this invention.

All of the ceramic materials of Example 1 through 7 fall within the narrow range of compositions which are the subject of the invention that is described in the above-identified cross-referenced application. This special class of materials is uniquely capable of becoming highly conductive after sintering to maturity in an atmosphere of air or a safe, low cost inert gas atmosphere. The use of these materials for firing in an inert gas atmosphere rather than in air leads to more highly conductive grains and allows high dielectric constants to be obtained with relatively low purity $SrTiO_3$.

The experiments described in Example 1 for doping with even tiny amounts of manganese and sintering in air leads to strontium titanate bodies with no barrier layers and very low Ka. Other acceptor dopants are shown in Example 2 to have no such effect with the exception of chromium that shows only mild effect.

The experiments reported in Example 3 revealed, quite contrary to expectations with respect to the results of the foregoing Examples, that the addition of manganese to nitrogen fired bodies yielded barrier layer capacitors with high insulation resistance and high apparent dielectric constant. This curious transformation takes place at manganese levels of as little as 0.01 mole percent.

The experiments of Example 4 show that the donor doped strontium titanate bodies, initially adjusted for strontium vacancies in the manner described in the cross-referenced application without the addition of manganese, when fired in nitrogen provide poor electrical characteristics. This was shown to be remedied in Example 5 wherein the oxidation was accomplished at the conventionally high temperature of 1100° C. followed by a low temperature (900° C.) electroding step. On the other hand in capacitors of Example 6 wherein the one step oxidation/electroding step was retained and a minute amount of manganese had been added to the start materials, excellent electrical properties were obtained.

Again in Example 7, the effect of minute quantities of Mn in the start materials is demonstrated, this time for high purity $SrTiO_3$, for which excellent insulation resistance was obtained along with values of Ka exceeding 50,000.

It is to be expected that some variation in the apparent dielectric constant (Ka) might be obtained when different sources of $SrTiO_3$ are used that vary in their impurity content. This is because insoluble impurities such as $SiO_2$ tend to lower the apparent dielectric constant (Ka) for a given grain size by increasing the thickness of the resistive intergranular layers.

High purity $SrTiO_3$, e.g. reagent grade $SrTiO_3$, generally contains less than a total of 0.1 wt % of the commonly occurring impurities such as silica, alumina and soda, and it is so defined herein. Industrial grade $SrTiO_3$ is herein defined as having more.

This unique behavior of manganese is hard to understand because electron probe microanalysis (EPM) of $SrTiO_3$ doped with 1.0 mole % Y and 0.05 mole % Mn fired at 1450° C. in air from Example 1 shows virtually no manganese in the grains; whereas the EPM of such a body fired in $N_2$ shows a much higher level of manganese in the grains and far less in the grain boundaries. It is possible that, in the $N_2$ firing, $Mn^{+2}$ substitutes for $Sr^{+2}$ and so has no electrical effect; but when fired in air it substitutes for the $Ti^{+4}$ as $Mn^{+3}$ in very small amounts, but amounts which are sufficient to compensate the conductivity provided by the electrons from oxygen vacancies. We could further conjecture about how the presence of manganese in the $N_2$ sintered body enables achievement of high insulation resistance after re-oxidation. It is possible that the grain surfaces dissolve with the bismuth-copper flux and recrystallize with the manganese incorporated as $Mn^{+3}$ on titanium sites.

In the prior art, manganese has been used ocassionally as a reoxidant applied to the surface of the body as a paste, either on its own or in mixtures with $Bi_2O_3$ or $Cu_2O$, after the body has been made semiconducting. We have found that when small amounts of manganese are present in the start materials, no beneficial effect can be obtained by adding manganese to the surface of the body as an oxidant or in the electroding paste; in fact, deleterious results such as low insulation resistance or high dissipation factors have been obtained when the amount of manganese applied to the body was not precisely controlled in a narrow range.

From practical experience, the introduction of manganese to the body via the oxidizing paste, instead of dierectly to the start materials, appears quite difficult to control. Because of the problem of obtaining a uniform distribution of manganese via the paste within the body, it is advantageous in manufacturing to add manganese in the start materials according to the method of this invention.

What is claimed is:

1. A method for making a ceramic intergranular barrier layer type capacitor comprising:
   (a) preparing a ceramic start mixture consisting essentially of strontium, titanium, a strontium-titanate-donor and manganese, said donor being selected from large cations A, small cations B and combinations thereof, said start mixture being adjusted to form during sintering a strontium titanate ceramic compound,

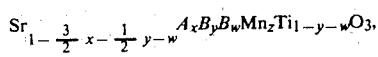

wherein x, y and w are the atomic proportions, respectively, of said donor cations having a charge of +3, +5 and +6, so that both charge balance and large/small cation balance may be established by strontium vacancies, $$(V_{Sr})_{\frac{1}{2}x+\frac{1}{2}y+w}$$

therein, wherein x+y+w is from 0.003 to 0.021 and wherein z lies between 0.00005 and 0.0025;
   (b) forming a body of said mixture;
   (c) sintering said body in an inert atmosphere to maturity; and
   (d) forming a mixture of oxidizing agents and silver particles, applying a coat of said mixture to selected surface portions of said sintered body, and heating said coated body at a temperature of about 900° C.

2. The method of claim 1 wherein said oxidizing agents are essentially manganese free.

3. The method of claim 1 wherein said oxidizing agents consist essentially of a major part by weight of $Bi_2O_3$ and a minor part by weight $Cu_2O$.

4. The method of claim 1 wherein said preparing includes mixing a powdered industrial grade $SrTiO_2$ with powders of said donor and manganese dioxide to form said start mixture, and wherein said donor sum, x+y+w, is from 0.007 to 0.021.

5. The method of claim 1 wherein said preparing includes mixing a powdered high-purity reagent grade $SrTiO_3$ with powders of said donor and of manganese dioxide to form said start mixture, and wherein said donor sum, x+y+w, is from 0.003 to 0.017.

* * * * *

UNITED STATES PATENT AND TRADEMARK OFFICE
CERTIFICATE OF CORRECTION

PATENT NO. : 4,397,886
DATED : August 9, 1983
INVENTOR(S) : Stephen M. Neirman et al It is certified that error appears in the above—identified patent and that said Letters Patent is hereby corrected as shown below:

Cover page, under "[56] References Cited", the following references should be listed:

-- U.S. PATENT DOCUMENTS

| | | | |
|---|---|---|---|
| 3,386,856 | 6/1968 | Noorlander | 357/10 |
| 3,673,119 | 6/1972 | Ueoka et al | 252/520 |
| 4,143,207 | 3/1979 | Itakura et al | 428/539 |

FOREIGN PATENT DOCUMENTS

| | | |
|---|---|---|
| 2,068,931 | 8/1981 | United Kingdom |

OTHER PUBLICATIONS

Waku et al, Review of the Electrical Communication Laboratories, Vol. 19, Nos. 5-6, May-June 1971, pp. 665-679 --
Column 3, line 45, "30 3" should read -- +3 --
Claim 4, line 2 (Col 8, L 53) "$SrTiO_2$" should be -- $SrTiO_3$ --

Signed and Sealed this

First Day of November 1983

[SEAL]

Attest:

Attesting Officer

GERALD J. MOSSINGHOFF
Commissioner of Patents and Trademarks